US007145562B2

(12) United States Patent
Schechter et al.

(10) Patent No.: US 7,145,562 B2
(45) Date of Patent: Dec. 5, 2006

(54) INTEGRATION OF THREE DIMENSIONAL SCENE HIERARCHY INTO TWO DIMENSIONAL COMPOSITING SYSTEM

(75) Inventors: Greg D. Schechter, Seattle, WA (US); Joseph S. Beda, Seattle, WA (US); Gregory D. Swedberg, Bellevue, WA (US); Adam M. Smith, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/838,935

(22) Filed: May 3, 2004

(65) Prior Publication Data

US 2005/0243086 A1 Nov. 3, 2005

(51) Int. Cl.
*G06T 17/00* (2006.01)
(52) U.S. Cl. ...................................... 345/420
(58) Field of Classification Search ................ 345/419, 345/420, 619, 440; 382/100, 154
See application file for complete search history.

(56) References Cited

U.S. PATENT DOCUMENTS

| 6,518,965 B1 * | 2/2003 | Dye et al. ................... 345/419 |
| 6,912,293 B1 * | 6/2005 | Korobkin .................... 382/100 |
| 2005/0140694 A1 | 6/2005 | Subramanian et al. ...... 345/619 |
| 2005/0140964 A1 * | 6/2005 | Eschenauer et al. .......... 356/10 |

OTHER PUBLICATIONS

International Search Report for PCT/US04/24368.

* cited by examiner

*Primary Examiner*—Kimbinh T. Nguyen

(74) *Attorney, Agent, or Firm*—Merchant & Gould P.C.

(57) ABSTRACT

A hierarchy of 2D visual objects and 3D scene objects are integrated for seamless processing to render 2D images including a 2D view of a 3D scene on a 2D computer display. The processing of the 3D model objects and 2D visual objects in the visual hierarchy is integrated so that the processing is readily handed off between 3D and 2D operations. Further the number of transitions between processing visual 2D objects and 3D model objects when creating a display image has no architectural limit. A data structure integrates computer program objects for creating 3D images and 2D images in a visual tree object hierarchy having visual 2D objects or 3D scene objects pointing to 3D model objects. The data structure comprises an object tree hierarchy, one or more visual 2D objects, and one or more 3D reference or scene objects pointing to 3D model objects. The visual 2D objects define operations drawing a 2D image. The 3D reference or scene objects define references pointing to objects with operations that together draw a two-dimensional view of a three-dimensional scene made up of one or more 3D models. The 3D reference or scene objects point to 3D model objects and a camera object. The camera object defines a two-dimensional view of the 3D scene. The 3D model objects draw the 3D models and define mesh information used in drawing contours of a model and material information used in drawing surface texture of a model. The material information for the surface texture of a model may be defined by a visual 2D object, a 3D reference or scene object or a tree hierarchy of visual 2D objects and/or 3D reference scene objects.

19 Claims, 10 Drawing Sheets

INTEGRATION OF THREE DIMENSIONAL SCENE HIERARCHY INTO TWO DIMENSIONAL COMPOSITING SYSTEM

CROSS REFERENCE TO RELATED APPLICATION

The present application is related to U.S. patent application Ser. No. 10/838,931, entitled TRANSLATING USER INPUT THROUGH TWO-DIMENSIONAL IMAGES INTO THREE-DIMENSIONAL SCENE, filed May 3, 2004 and U.S. patent application Ser. No. 10/838,936 entitled MODEL 3CONSTRUCTION APPLICATION PROGRAM INTERFACE, filed May 3, 2004, both applications assigned to the Assignee of the present invention and hereby incorporated by reference in their entirety.

TECHNICAL FIELD

The invention relates generally to the field of computer graphics. More particularly, the invention relates to integrating three-dimensional graphics in a two dimensional compositing system.

BACKGROUND OF THE INVENTION

The limits of the traditional model of accessing graphics on computer systems are being reached, in part because memory and bus speeds have not kept up with the advancements in main processors and/or graphics processors. In general, the current model for preparing a frame using bitmaps requires too much data processing to keep up with the hardware refresh rate when complex graphics effects are desired. As a result, when complex graphics effects are attempted with conventional graphics models, instead of completing the changes that result in the perceived visual effects in time for the next frame, the changes may be added over different frames, causing results that are visually undesirable.

Further, this problem is aggravated by the introduction of three dimensional (3D) graphics and special effects such as animation of the 3D images being displayed. What is needed is a graphics generation and compositing system that can render 3D images in real time, creating the images as the images are called up by the computer program. Further, the creation of 3D images should be integrated into two-dimensional (2D) graphics display as needed to provide a mix of 3D and 2D images on the display. It is with respect to these considerations and others that the present invention has been made.

SUMMARY OF THE INVENTION

The above and other problems are solved by integrating 3D model objects into a hierarchy of 2D visual objects and seamlessly processing 3D images and 2D images for rendering on a 2D display. The processing of the 3D model objects and 2D visual objects in the visual hierarchy is integrated so that the processing is readily handed off between 3D and 2D operations. Further the number of transitions between processing visual 2D objects and 3D model objects when creating a display image has no architectural limit. Thus, the user is free to create graphics embedding 3D images in 2D images and 2D images in 3D images ad infinitum. For example, a user interface dialog box could be textured onto a sphere which is displayed as part of another dialog box which in turn is textured onto a cone.

In accordance with another aspect, the present invention relates to a data structure for integrating computer program objects for creating 3D images and 2D images in a visual tree object hierarchy having visual 2D objects or 3D scene objects pointing to 3D model objects. The data structure comprises an object tree hierarchy, one or more visual 2D objects, and one or more 3D reference or scene objects pointing to 3D model objects. The visual 2D objects define operations drawing a 2D image. The 3D reference or scene objects define references pointing to objects with operations that together draw a two-dimensional view of a three-dimensional scene made up of one or more 3D models. The 3D reference or scene objects point to 3D model objects and a camera object. The camera object defines a two-dimensional view of the 3D scene. The 3D model objects draw the 3D models and define mesh information used in drawing contours of a model and material information used in drawing surface texture of a model. The material information for the surface texture of a model may be defined by a visual 2D object, a 3D reference or scene object or a tree hierarchy of visual 2D objects and/or 3D reference scene objects.

In accordance with a further aspect, the present invention relates to a method for processing a hierarchy of computer program visual objects for creating a mix of two-dimensional (2D) and three-dimensional (3D) images as output from a computer. The method comprises traversing branches of a first tree hierarchy of visual objects to process leaf objects and branch objects and detecting whether the next unprocessed visual object is a visual 2D object or a visual 3D object. If a visual 2D object is detected, a 2D process is called to process the visual object. If a visual 3D object is detected, a 3D process is called to process the visual object. The 3D process sets a camera view and draws images of one or more 3D models defined by the visual 3D object. The images are drawn based on the camera view of the one or more 3D models.

The invention may be implemented as a computer process, a computing system or as an article of manufacture such as a computer program product or computer readable media. The computer readable media may be a computer storage media readable by a computer system and encoding a computer program of instructions for executing a computer process. The computer readable media may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
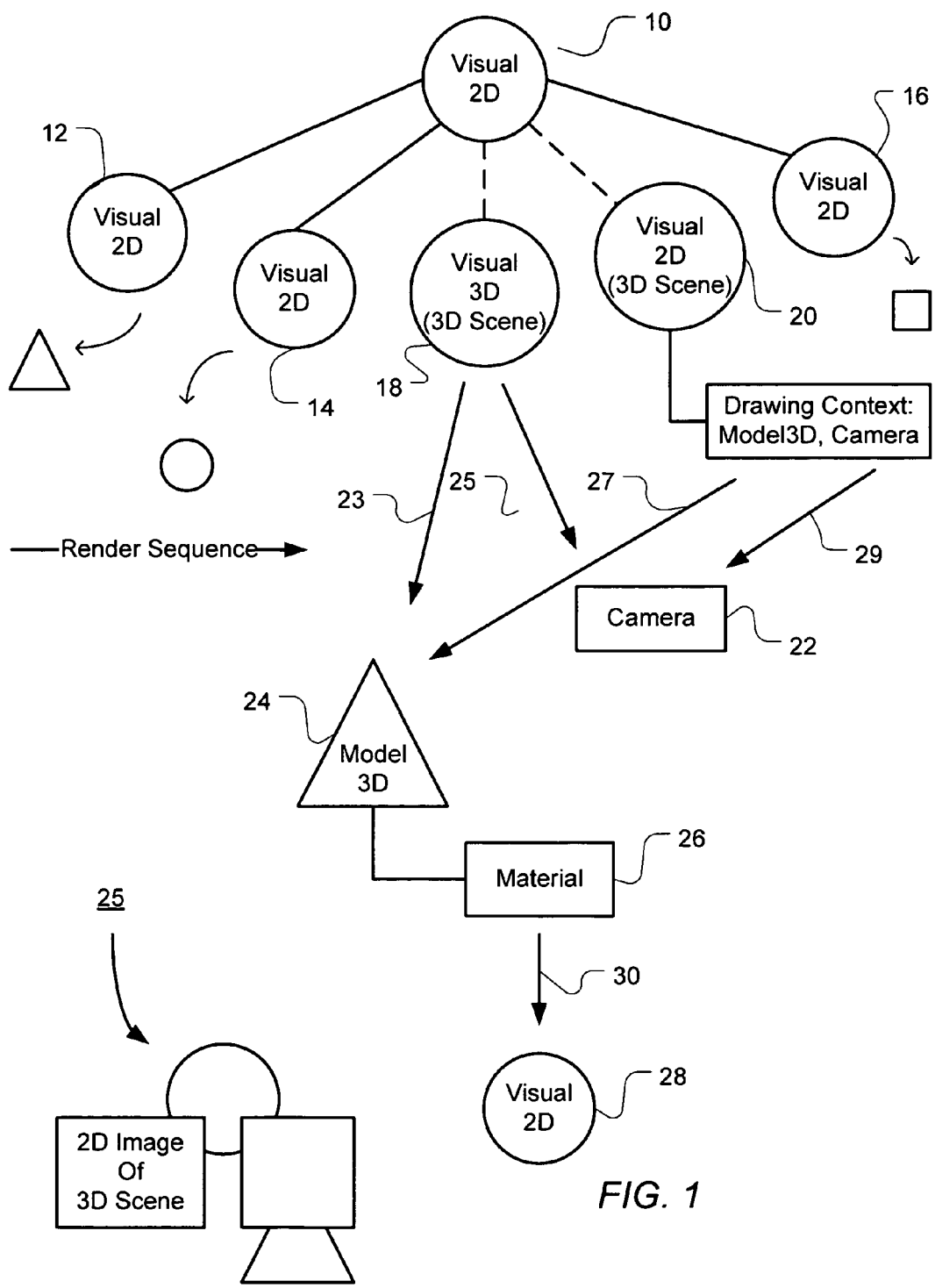
FIG. 1 illustrates a visual object hierarchy organized in accordance with one embodiment of the present invention to embed 3D objects in a visual tree of 2D objects.

In accordance with one embodiment of the invention, FIG. 1 illustrates 3D reference or scene objects integrated into a visual objects tree hierarchy so that the tree has both visual 2D objects and 3D reference or scene visual objects. "Visual", when associated herein with objects, represents a drawing rendered on a computer display screen by the object. In this exemplary illustration of a visual tree, a root visual object 10 has four children with alternate embodiments for one child that is a 3D scene child. The visual 2D children are objects 12, 14, and 16, and one of the 3D scene objects 18 and 20 in the alternative is the fourth child of the root visual object 10.

The 3D scene object 18 is a visual 3D object 18 and contains a reference or pointer 23 to model 3D object(s) 24 and a reference or pointer 25 to a camera object 22 for viewing a 3D models as a 2D image. Visual 3D objects are described in more detail in the cross-referenced patent application entitled MODEL 3D CONSTRUCTION APPLICATION PROGRAM INTERFACE and cited above. The camera 22 views the 3D model(s) drawn by object(s) 24 as a 3D scene. The model 3D object(s) 24 and camera object 22 together produce a 2D image of the 3D scene on a computer display screen. The 3D scene object 20 is a visual 2D object with drawing context. In this embodiment of the invention, the drawing context of the visual 2D object contains the reference or pointer 27 to the model 3D object(s) 24 and the reference or pointer 29 to the camera object 22.

To create an image and render a display the branches of the visual tree are traversed and processed from left to right; thus the render sequence in FIG. 1 is shown from left to right.

The visual 2D object with drawing context and the processing of the visual tree is described in the commonly-assigned application entitled TRANSLATING USER INPUT THROUGH TWO-DIMENSIONAL IMAGES INTO THREE-DIMENSIONAL SCENE cited above in the cross-reference to related applications. above in the cross-reference to related applications. A brief review of that processing will be included herein in the description of FIGS. 3 through 5.

To illustrate how an image display is produced in this render sequence we will assume that the visual 2D object 12 creates a triangle, the visual 2D object 14 produces a circle, and the visual 2D object 16 produces a square. The 3D scene visual 3D object 18 or 3D scene visual 2D object 20 produces a 3D scene as viewed from a camera. Since the render sequence is from left to right and later rendered objects overlay earlier rendered objects, the visual tree 8 will produce the display image 25 in FIG. 1. In other words, the triangle, produced from visual 12, and the circle, produced from visual 14, are overlapped by the square provided by visual 16 because visual 16 is processed after visual 12 and 14. Likewise, the 2D view of the 3D scene created by 3D scene object 18 or 20 is produced after the circle and overlays the circle. By providing a 3D scene objects containing a 3D scene and a virtual camera to view that scene, the 3D scene is converted to a 2D image which can be rendered as another 2D image from the visual tree. Further, since the images are drawn rather than being bitmap images, the display can be rendered in real time on a computer display screen or as other computer video output.

In another significant feature of the invention, the 3D model object(s) 24 have material or texture information 26. The material information 26 can point to another visual tree represented by visual object 28. This visual object 28 may have visual 2D objects and 3D scene objects just as visual tree root object 10. Thus, the visual tree hierarchy can embed 3D scene objects in a visual tree with 2D objects and, further, a second visual tree with 2D objects and 3D scene objects can in turn be embedded in the 3D models of the 3D scene objects in the first visual tree. This sequential alternate embedding of 3D and 2D objects in the tree hierarchy can proceed as many times as desired by the graphics program creator to create the desired display of mixed 2D and 3D images.

Figure 5:
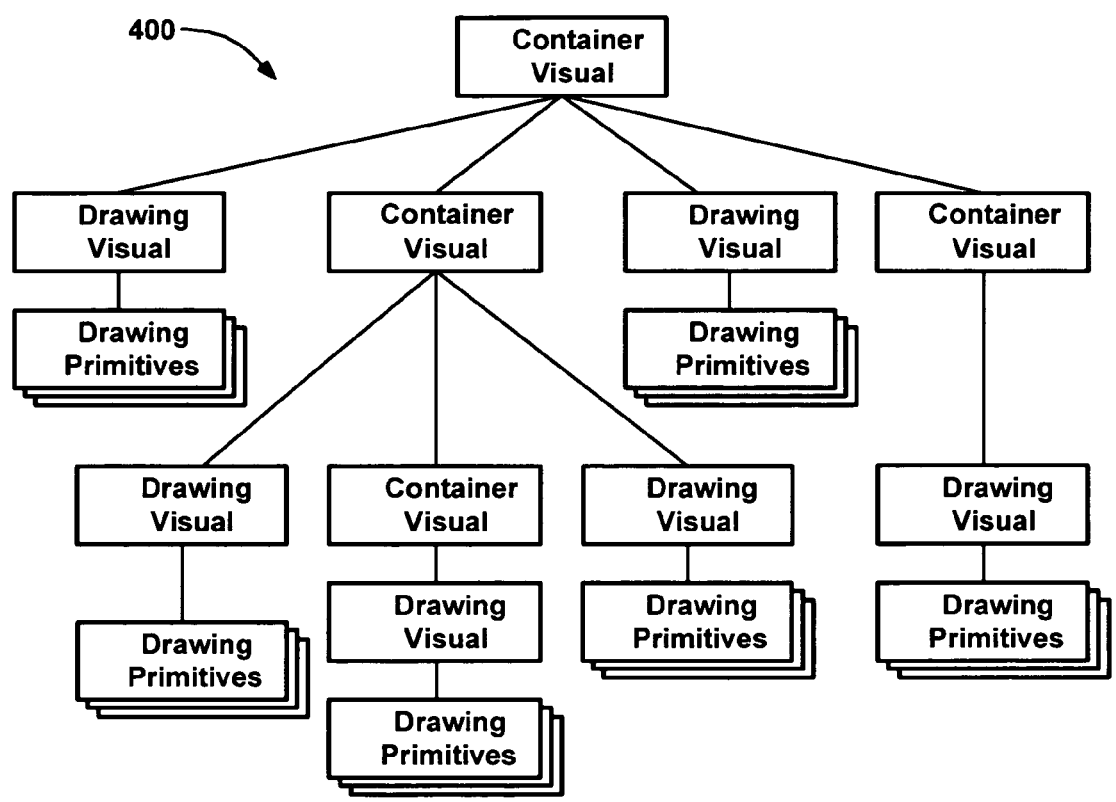
FIG. 5 is a representation of a scene graph of validation visuals, drawing visuals and associated drawing primitives constructed.
Figure 6:
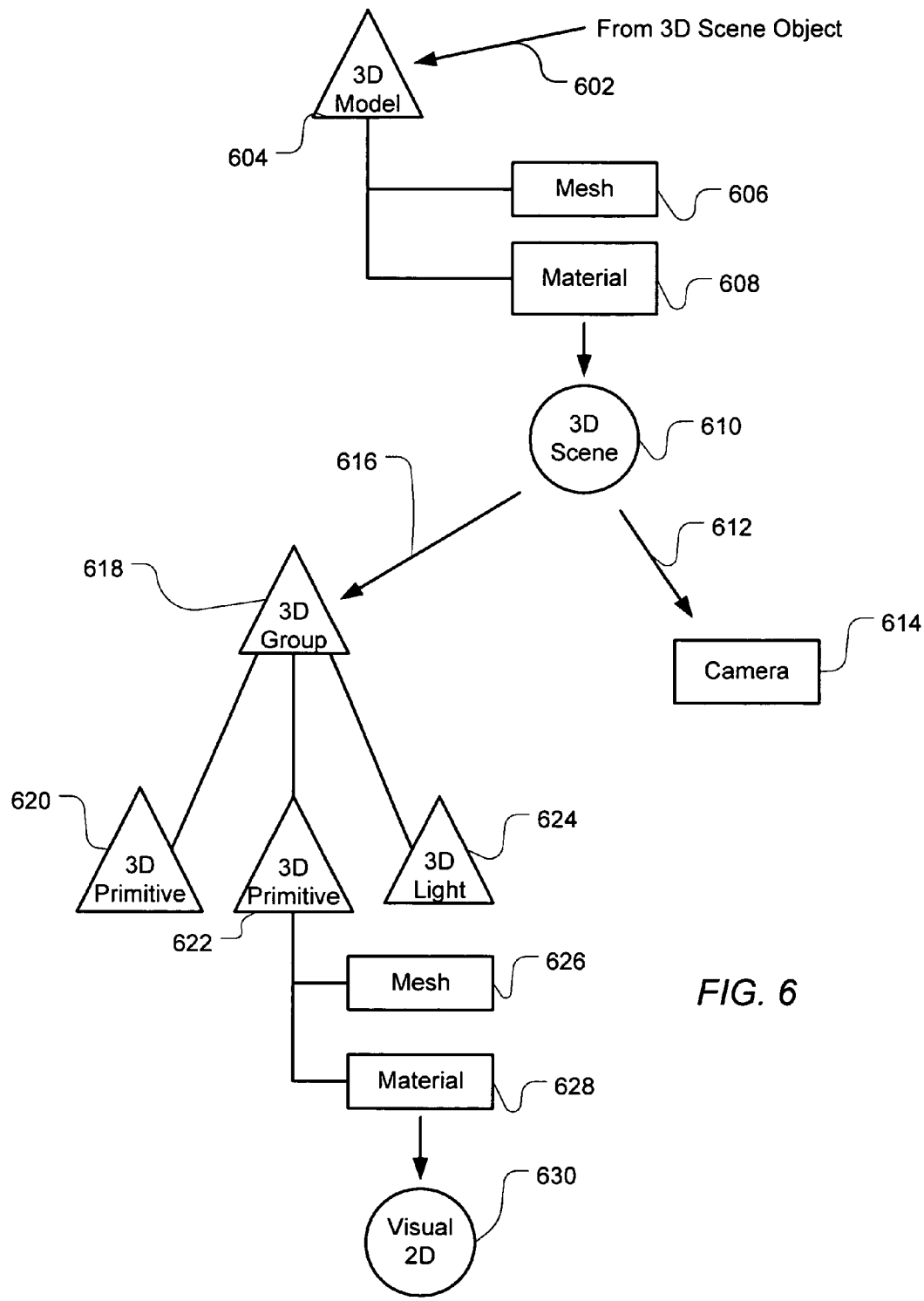
FIG. 6 illustrates a detailed example of a portion of a visual tree hierarchy where a visual 3D object has pointed to a 3D model object having a primitive 3D object with visual 3D content that further points to 3D scene made up of a group of 3D models with one such 3D model having a visual 2D object as material content.

A more detailed illustration of the integration of 3D objects with 2D objects in a visual tree hierarchy is shown in FIG. 6. However, FIGS. 2–5 are now described to provide an exemplary operating environment and a software environment for processing the integrated visual tree hierarchy.

Exemplary Operating Environment

Figure 2:
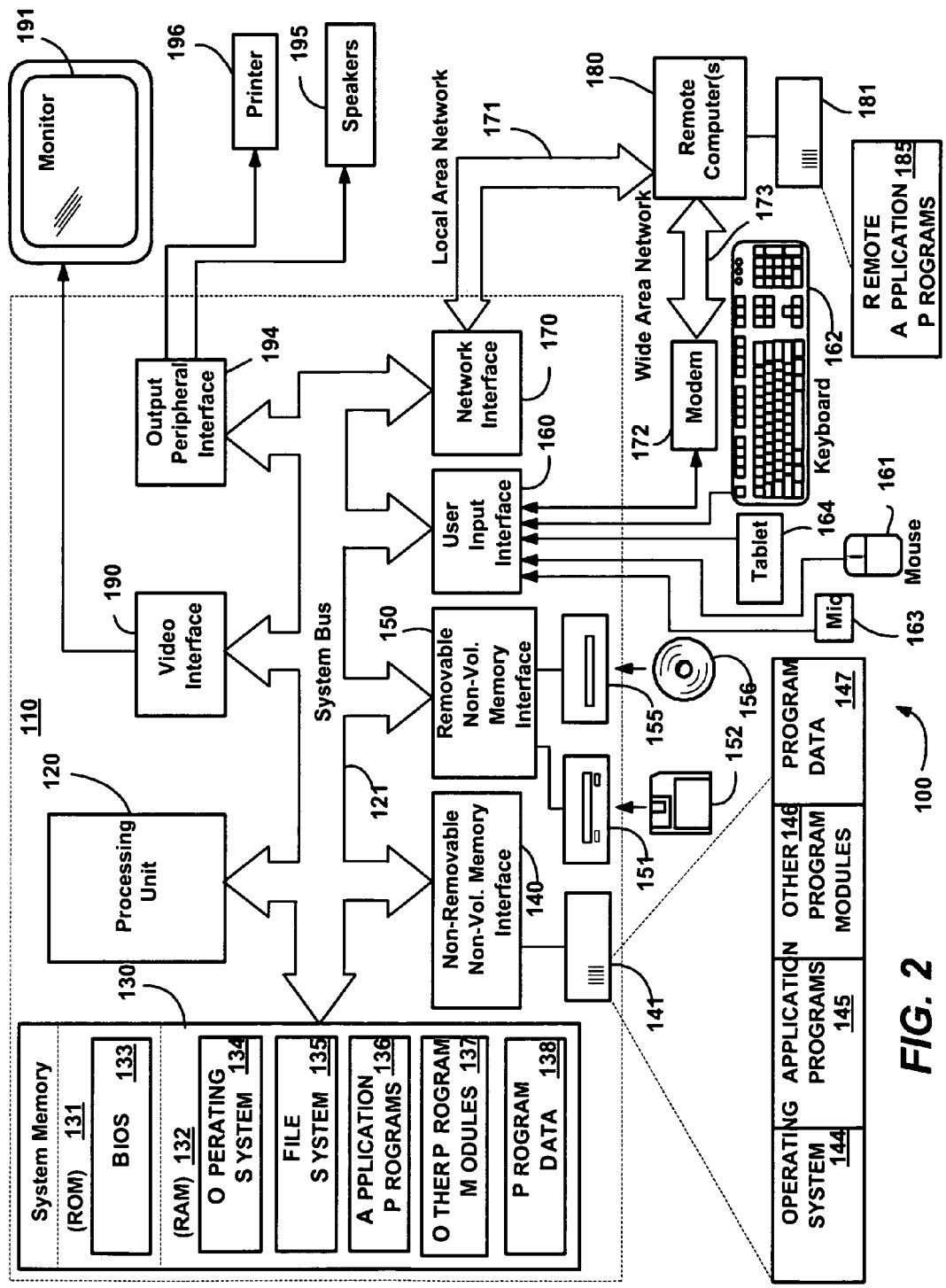
FIG. 2 illustrates an example of a suitable computing system environment on which embodiments of the invention may be implemented.

FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Accelerated Graphics Port (AGP) bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 2, provide storage of computer-readable instructions, data structures, program modules and other data for the computer 110. In FIG. 2, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet (electronic digitizer) 164, a microphone 163, a keyboard 162 and pointing device 161, commonly referred to as mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel 193 or the like that can input digitized input such as handwriting into the computer system 110 via an interface, such as a touch-screen interface 192. Note that the monitor and/or touch screen panel can be physically coupled to a housing in which the computing device 110 is incorporated, such as in a tablet-type personal computer, wherein the touch screen panel 193 essentially serves as the tablet 164. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Software Environment for Processing the Visual Tree Hierarchy

Figure 3:
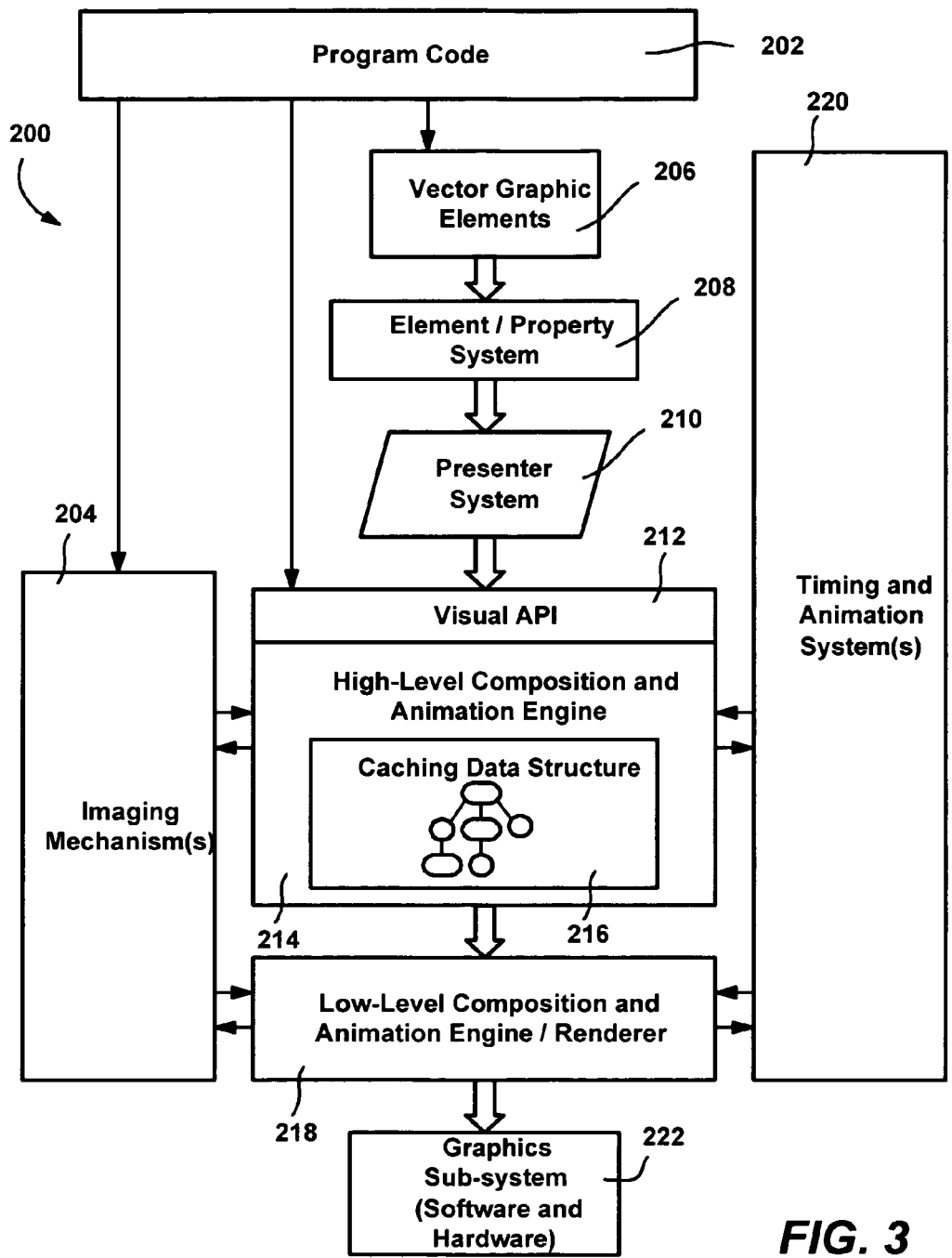
FIG. 3 is a block diagram generally representing a graphics layer architecture into which the present invention may be incorporated.

FIG. 3 represents a general, layered architecture 200 in which visual trees may be processed. As represented in FIG. 3, program code 202 (e.g., an application program or operating system component or the like) may be developed to output graphics data in one or more various ways, including via imaging 204, via vector graphic elements 206, and/or via function/method calls placed directly to a visual application programming interface (API) layer 212, in accordance with an aspect of the present invention. In general, imaging 204 provides the program code 202 with a mechanism for loading, editing and saving images, e.g., bitmaps. As described below, these images may be used by other parts of the system, and there is also a way to use the primitive drawing code to draw to an image directly. Vector graphics elements 206 provide another way to draw graphics, consistent with the rest of the object model (described below). Vector graphic elements 206 may be created via a markup language, which an element/property system 208 and presenter system 210 interprets to make appropriate calls to the visual API layer 212.

The graphics layer architecture 200 includes a high-level composition and animation engine 214, which includes or is otherwise associated with a caching data structure 216. The caching data structure 216 contains a scene graph comprising hierarchically-arranged objects that are managed according to a defined object model, as described below. In general, the visual API layer 212 provides the program code 202 (and the presenter system 210) with an interface to the caching data structure 216, including the ability to create objects, open and close objects to provide data to them, and so forth. In other words, the high-level composition and animation engine 214 exposes a unified media API layer 212 by which developers may express intentions about graphics and media to display graphics information, and provide an underlying platform with enough information such that the platform can optimize the use of the hardware for the program code. For example, the underlying platform will be responsible for caching, resource negotiation and media integration.

The high-level composition and animation engine 214 passes an instruction stream and possibly other data (e.g., pointers to bitmaps) to a fast, low-level compositing and animation engine 218. As used herein, the terms "high-level" and "low-level" are similar to those used in other computing scenarios, wherein in general, the lower a software component is relative to higher components, the closer that component is to the hardware. Thus, for example, graphics information sent from the high-level composition and animation engine 214 may be received at the low-level compositing and animation engine 218, where the information is used to send graphics data to the graphics subsystem including the hardware 222.

The high-level composition and animation engine 214 in conjunction with the program code 202 builds a scene graph to represent a graphics scene provided by the program code 202. For example, each item to be drawn may be loaded with drawing instructions, which the system can cache in the scene graph data structure 216. As will be described below, there are a number of various ways to specify this data structure 216, and what is drawn. Further, the high-level composition and animation engine 214 integrates with timing and animation systems 220 to provide declarative (or other) animation control (e.g., animation intervals) and timing control. Note that the animation system allows animate values to be passed essentially anywhere in the system, including, for example, at the element property level 208, inside of the visual API layer 212, and in any of the other resources. The timing system is exposed at the element and visual levels.

The low-level compositing and animation engine 218 manages the composing, animating and rendering of the scene, which is then provided to the graphics subsystem 222. The low-level engine 218 composes the renderings for the scenes of multiple applications, and with rendering components, implements the actual rendering of graphics to the screen. Note, however, that at times it may be necessary and/or advantageous for some of the rendering to happen at higher levels. For example, while the lower layers service requests from multiple applications, the higher layers are instantiated on a per-application basis, whereby is possible via the imaging mechanisms 204 to perform time-consuming or application-specific rendering at higher levels, and pass references to a bitmap to the lower layers.

Figure 4:
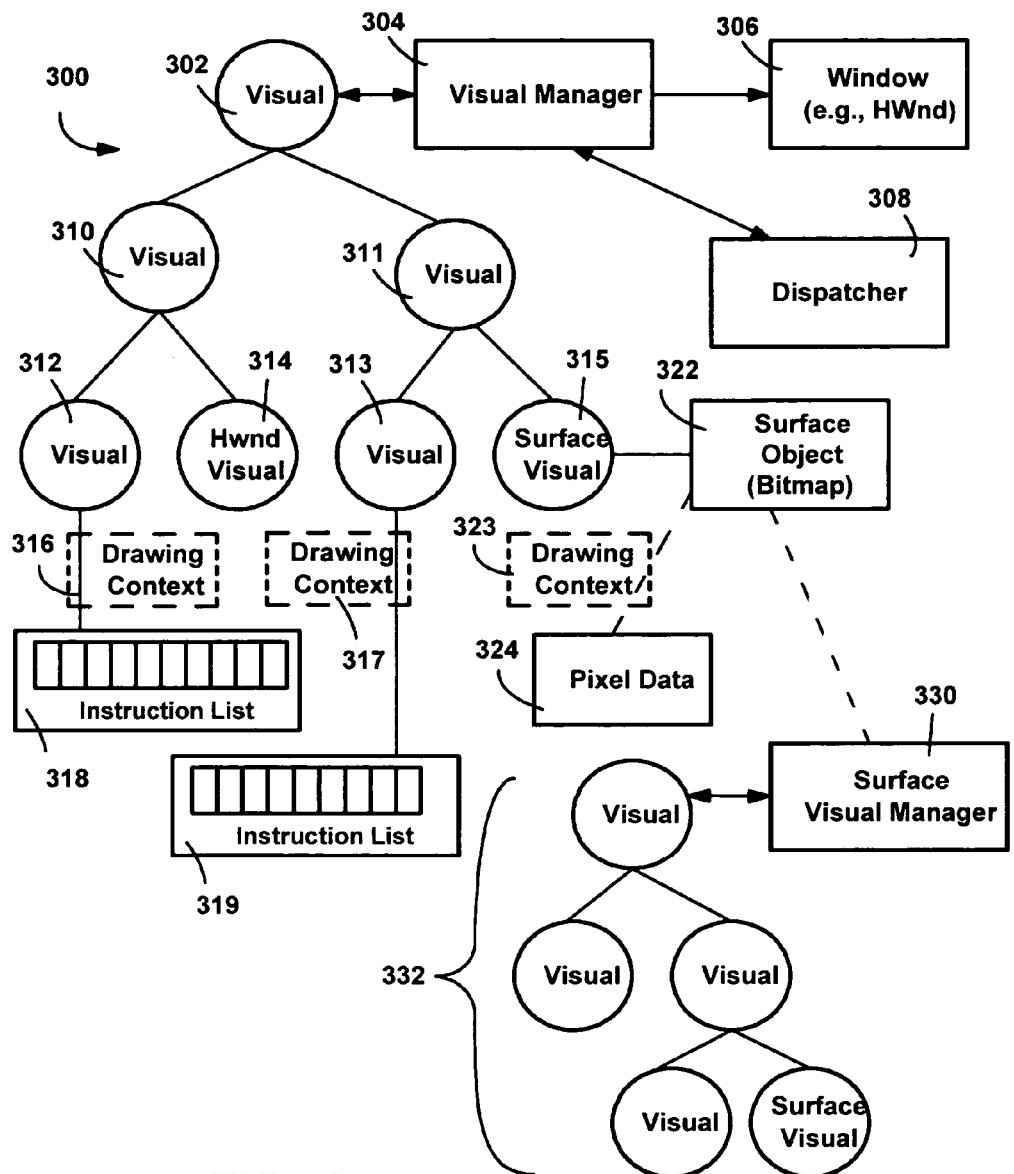
FIG. 4 is a representation of a scene graph of visuals and associated components for processing the scene graph such as by traversing the scene graph to provide graphics commands and other data.

FIGS. 4 and 5 show example scene graphs 300 and 400, respectively, including a base object referred to as a visual. In general, a visual comprises an object that represents a virtual surface to the user and has a visual representation on the display. As represented in FIG. 4, a top-level (or root) visual 302 is connected to a visual manager object 304, which also has a relationship (e.g., via a handle) with a window (HWnd) 306 or similar unit in which graphic data is output for the program code. The VisualManager 304 manages the drawing of the top-level visual (and any children of that visual) to that window 306. To draw, the visual manager 304 processes (e.g., traverses or transmits) the scene graph as scheduled by a dispatcher 308, and provides graphics instructions and other data to the low level component 218 (FIG. 3) for its corresponding window 306. The scene graph processing will ordinarily be scheduled by the dispatcher 308 at a rate that is relatively slower than the refresh rate of the lower-level component 218 and/or graphics subsystem 222. FIG. 4 shows a number of child visuals 310-315 arranged hierarchically below the top-level (root) visual 302, some of which are represented as having been populated via drawing contexts 316, 317 (shown as dashed boxes to represent their temporary nature) with associated instruction lists 318 and 319, respectively, e.g., containing drawing primitives and other visuals. The visuals may also contain other property information, as shown in the following example visual class:

```
public abstract class Visual : VisualComponent
{
    public Transform Transform { get; set; }
    public float Opacity { get; set; }
    public BlendMode BlendMode { get; set; }
    public Geometry Clip { get; set; }
    public bool Show { get; set; }
    public HitTestResult HitTest (Point point);
    public bool IsDescendant (Visual visual);
    public static Point TransformToDescendant (
        Visual reference,
        Visual descendant,
        Point point);
    public static Point TransformFromDescendant (
        Visual reference,
        Visual descendant,
        Point point);
    public Rect CalculateBounds( ); // Loose bounds
    public Rect CalculateTightBounds( ); //
    public bool HitTestable { get; set; }
    public bool HitTestIgnoreChildren { get; set; }
    public bool HitTestFinal { get; set; }
}
```

As can be seen, visuals offer services by providing transform, clip, opacity and possibly other properties that can be set, and/or read via a get method. In addition, the visual has flags controlling how it participates in hit testing. A Show property is used to show/hide the visual, e.g., when false the visual is invisible, otherwise the visual is visible.

A transformation, set by the transform property, defines the coordinate system for the sub-graph of a visual. The coordinate system before the transformation is called pre-transform coordinate system, the one after the transform is called post-transform coordinate system, that is, a visual with a transformation is equivalent to a visual with a transformation node as a parent.

A more complete description of the visual tree and the compositing system is included in the related patent application entitled TRANSLATING USER INPUT THROUGH TWO-DIMENSIONAL IMAGES INTO THREE-DIMENSIONAL SCENE cross-referenced above.

Integration of Visual 3D into Visual Tree Hierarchy

With the above hardware and software environment in mind, FIG. 6 illustrates the integration of 3D scene objects into a visual tree hierarchy also having visual 2D objects. As previously described with reference to FIG. 1, the visual 3D scene object creates a 2D image—camera view of a 3D scene. As described above for FIG. 1 the 3D scene object is implemented as a visual 3D object with a pointer to 3D model(s) or a visual 2D object having drawing context with a pointer to 3D model(s). Also as described for FIG. 1, there would be a second pointer shown in FIG. 1 to a camera object. In the example of FIG. 6 the pointer from 3D scene object to 3D model(s) is represented by pointer 602. This pointer 602 points to a 3D model primitive 604 which will draw a 3D object and make use of mesh information 606 and material information 608 in drawing the 3D object.

Mesh information 606 refers to a mesh of 2D shapes that may be used to approximate the 3D contours of the 3D model. For example, if one pictures pressing a cloth mesh net over a 3D model such as a chair; the net assumes the contours of the chair. Typically the mesh is made up of planar triangular shapes. The triangles are usually quite small and as such form a fine mesh that may be used to follow 3D contours. In addition to triangles other 2D shapes with more than three sides or even continuous sides may be used to form the mesh, but triangles are preferred because the three points of a triangle define a plane and this simplifies the computation of the mesh.

Material information 608, which is also information associated for 3D model object 604, refers to texture used to fill-in a surface on the image of the 3D model. Texture might be shading, color, or additional visual images. In FIG. 6 the additional visual image for the material is a 3D scene object 610.

The 3D scene object 610 may be either a visual 3D object or a visual 2D object as described in FIG. 1. In either event it will have a pointer to the 3D models and a pointer to the camera object. Pointer 612 points to the camera object to define the camera parameters to render the 2D view of the 3D scene. The pointer 616 to the 3D objects in FIG. 6 is a part of the 3D content 612. Pointer 616 is points to the root object 618 of the model 3D objects making up a 3D visual tree. The root object is 3D model group object 618. A 3D model group object serves as either as root node or collection node in a 3D visual tree containing one or more model 3D primitive objects. The primitive objects will be at the leaf of a branch in the visual 3D tree and contain the drawing information for creating a 3D model. In FIG. 6, there are two model 3D primitive objects—primitive 620 and primitive 622—and a model 3D light object 624. The light information content of light object 624 defines the light illuminating the 3D scene made up of the 3D models and the direction of the light rays if applicable. The draw information content of each of the 3D model primitives includes mesh information and material information. This content is only shown for primitive 622 as mesh information 626 and material information 628. The material information 628 may simply have drawing content information or it may have a visual 2D object or a 3D scene object or both. In the example in FIG. 6 the material information 628 has a visual 2D object 630.

To review the integration that is illustrated by FIG. 6, FIG. 6 starts with a pointer from a 3D scene object, such as object 18 or object 20 in FIG. 1, to a model 3D object 604. The model 3D object 604 has material information 608 that has a further 3D scene object 610 pointing to a model 3D group object 618 and a camera object 614. In the 3D scene defined by 3D group 618 with its children, the 3D primitive object 622 has material information pointing to a visual 2D object 630. In this way a visual tree hierarchy with 2D visual objects may have integrated into it a 3D scene created by a 3D scene object. In turn model 3D object in the 3D scene tree may have information pointing to a second visual tree that has integrated into it a further visual 2D object, a 3D scene object or both types of objects. This integration of 3D scene objects and visual 2D objects can proceed ad infinitum.

One of the salient features of the invention is the fact that the visual objects and model 3D objects do not store bitmaps of the images to be produced, but instead provide instructions for drawing the images when the visual tree is processed. Described immediately above was the processing for such a visual tree. The processing of a 3D scene visual tree is similar but adds a few operations to create the 2D view of a 3D scene defined by the model 3D objects.

Figure 7:
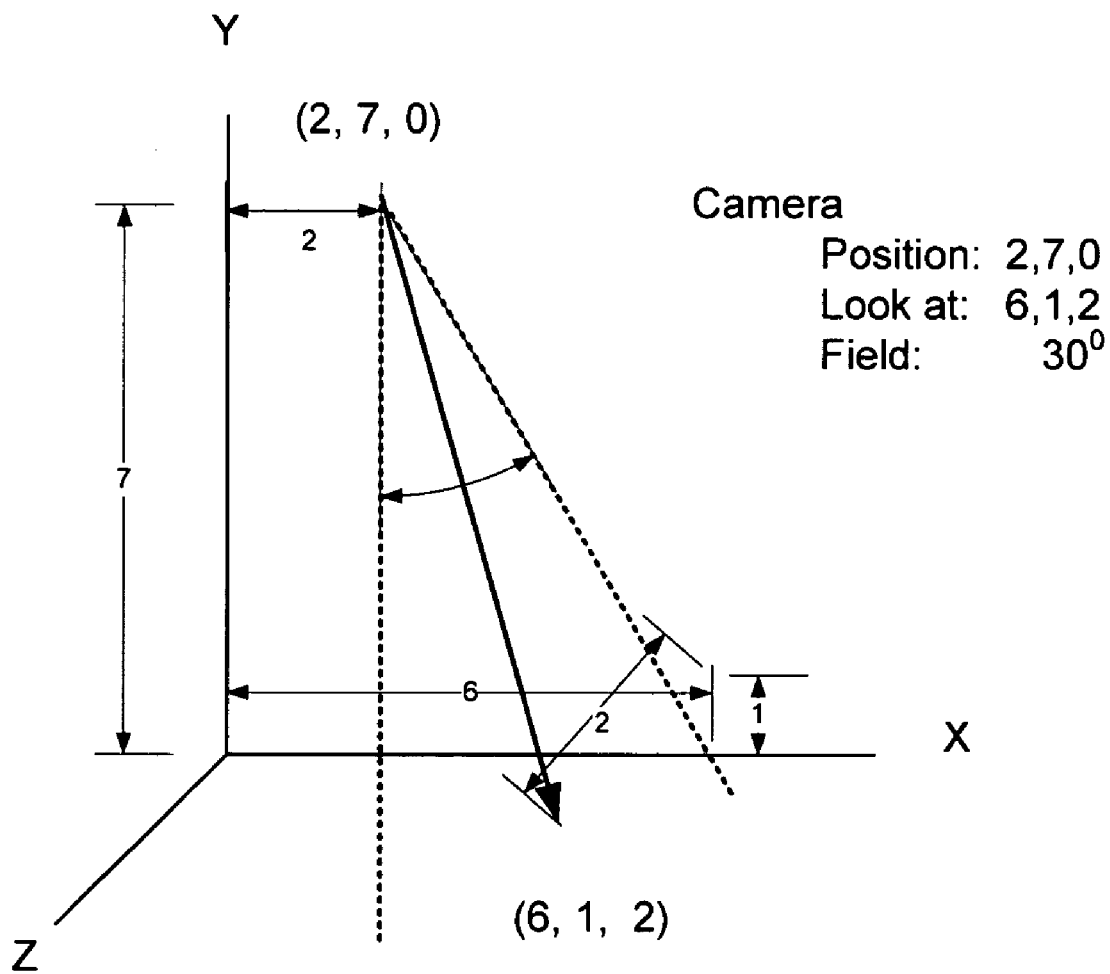
FIG. 7 illustrates the camera parameters used in defining a camera view or 2D view of a 3D scene or model.

A 3D scene object creates a camera view, i.e. a 2D view, of the 3D scene. The camera view is specified by parameters that identify the virtual camera "position," the "look at" or aim direction for the camera and the "field" of view of the camera. A example of camera parameters is illustrated in FIG. 7 where the camera position or viewpoint is located at X, Y, Z coordinates 2, 7, 0. The look-at or aim direction of the camera is specified by the look-at location XYZ is 6, 1, 2. The field of view of the camera is indicated as 30 degrees. These camera parameters are used to set the camera or 2D view when drawing the 3D models created by the 3D primitives.

These camera parameters reflect a perspective view camera. Other cameras might be used such as those described in the commonly assigned patent application entitled MODEL 3D CONSTRUCTION APPLICATION PROGRAM INTERFACE cited above in the cross-reference to related applications. For example an orthogonal camera would provide an orthogonal view where all light rays are parallel and the primary camera parameters are aim, or look-at, direction and field of view.

Figure 8:
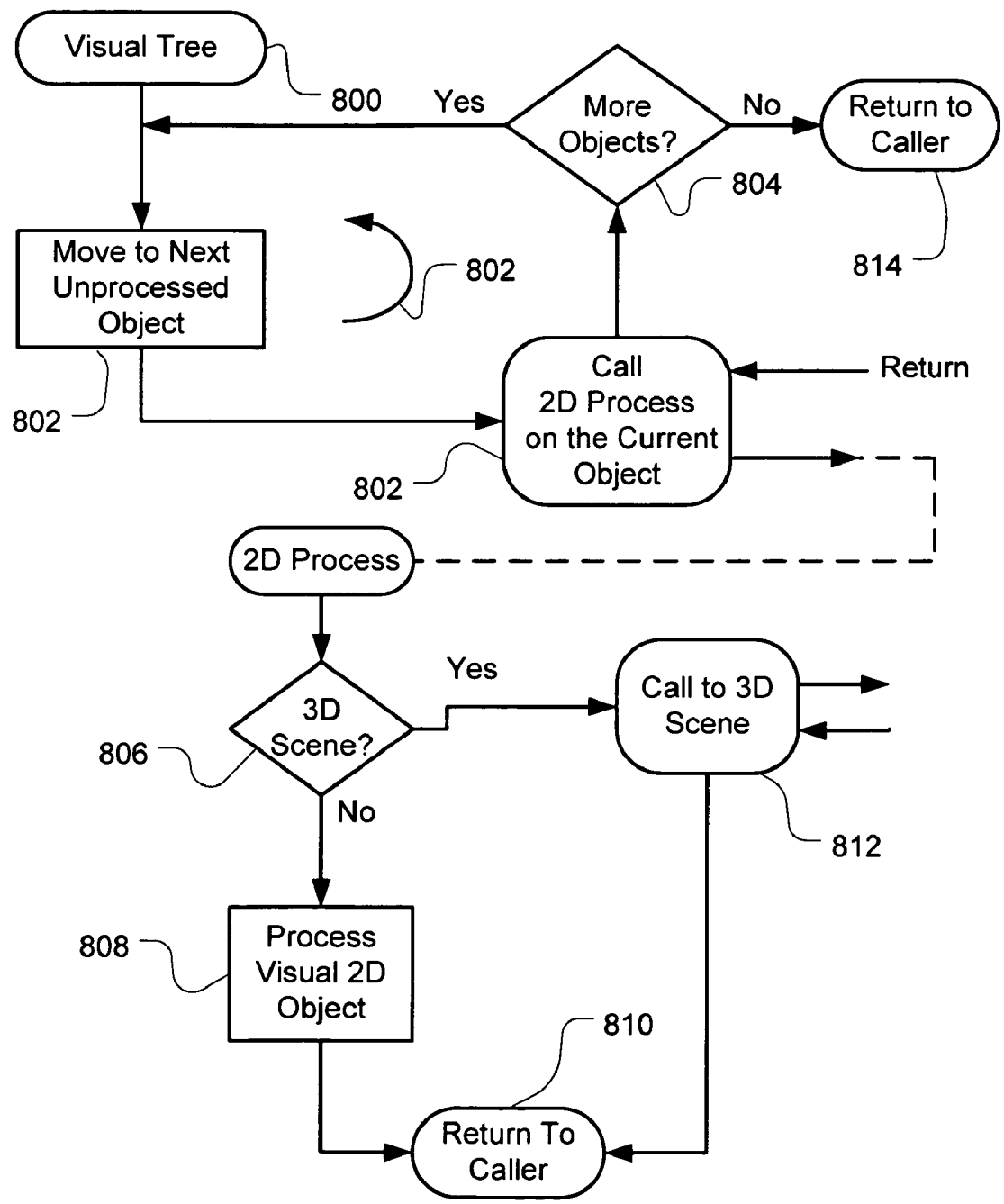
FIG. 8 is an operations flowchart illustrating operational flow for processing visual 2D objects in a visual tree and the transition to processing visual 3D objects in the same visual tree.
Figure 9:
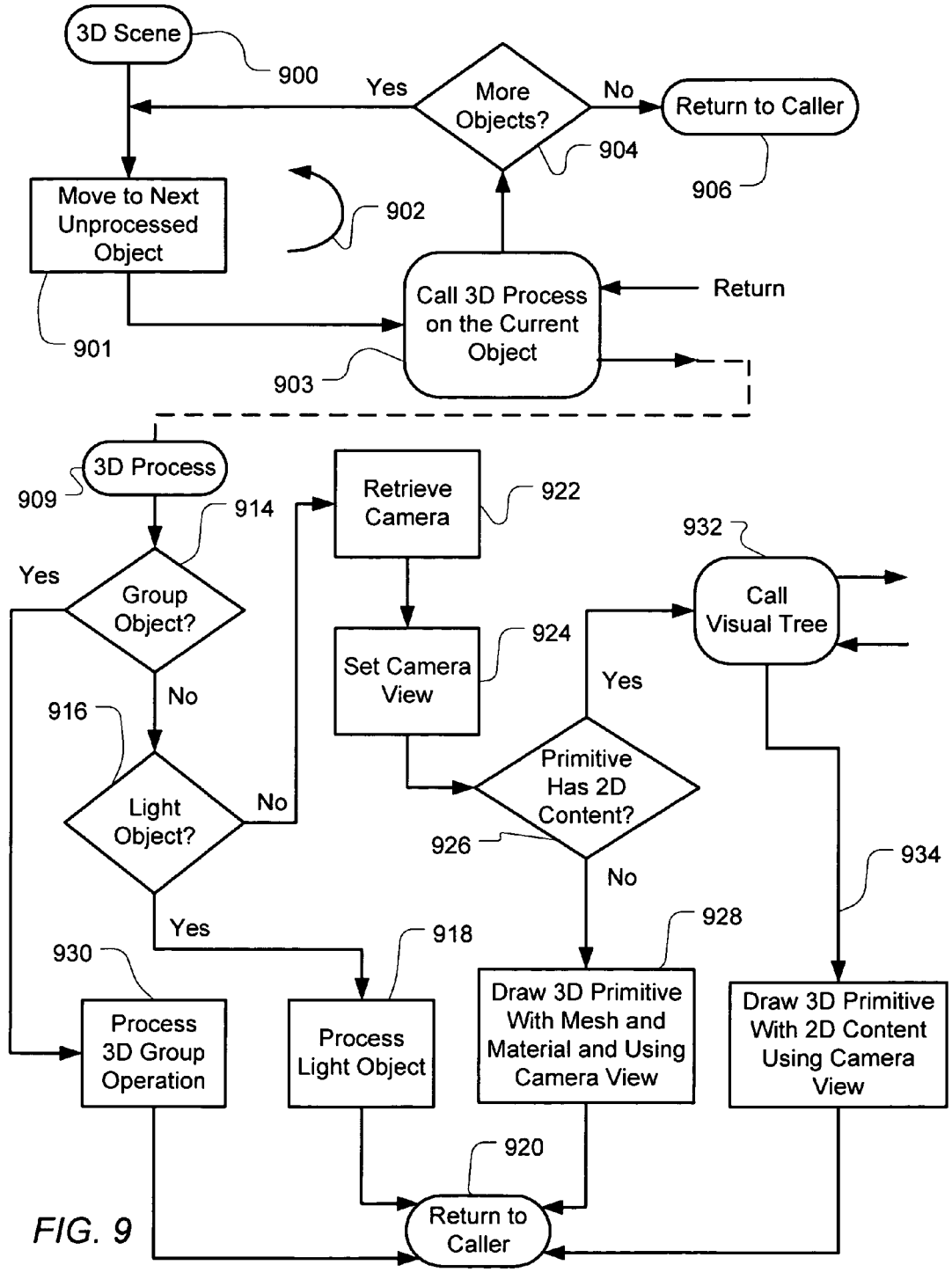
FIG. 9 is an operations flowchart illustrating operational flow for processing visual 3D objects in a visual tree and the transition to processing visual 2D objects in the same visual tree.
Figure 10:
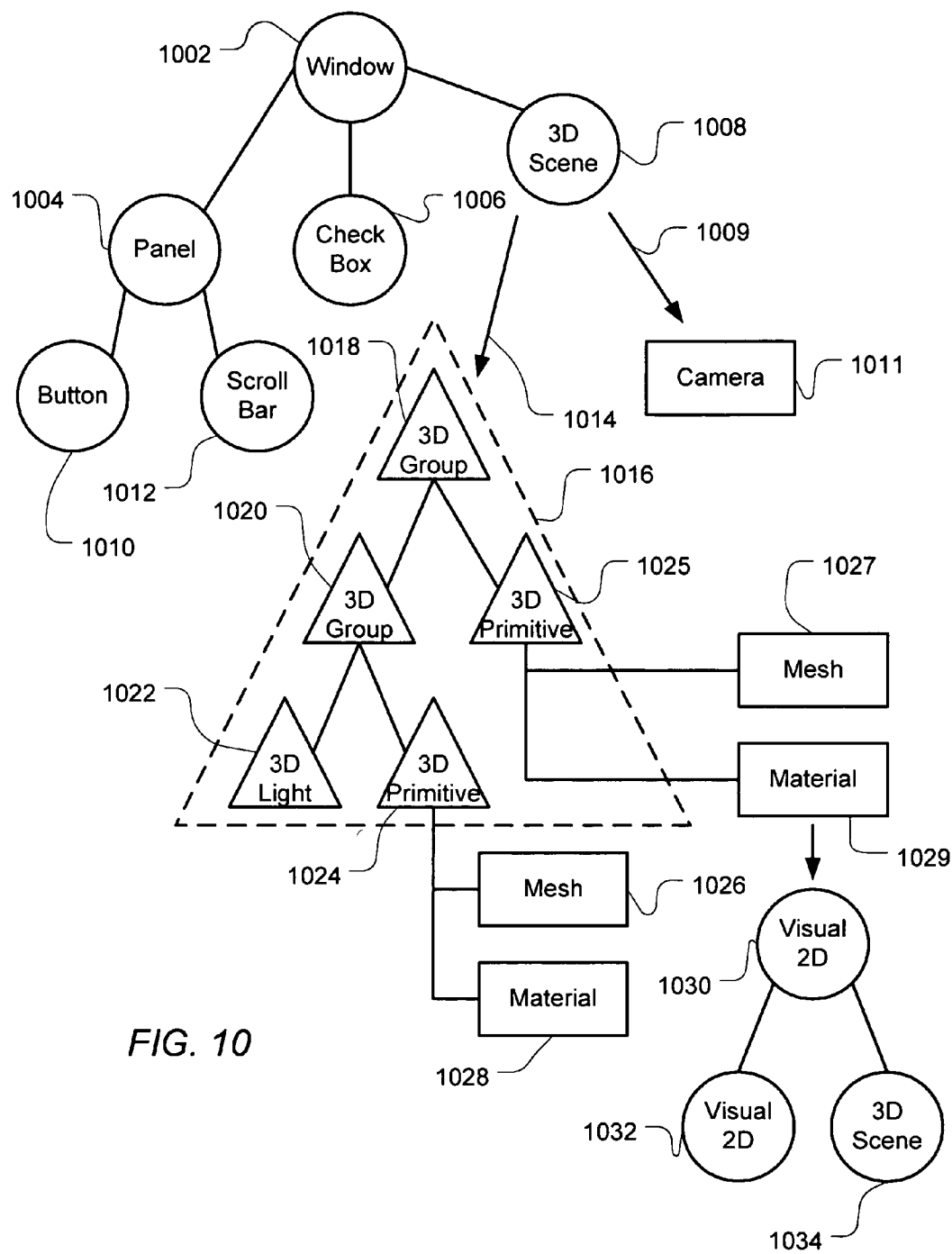
FIG. 10 is an exemplary visual objects tree illustrating processing by the operations flowcharts of FIGS. 8 and 9.

FIGS. 8 and 9 illustrate an operational flow for handling a visual tree containing both visual 2D objects and 3D scene objects. FIG. 10 is referred to during the description of FIGS. 8 and 9 as an example of a visual tree that is being processed by the operations in FIGS. 8 and 9. The logical operations of FIGS. 8 and 9 are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

In the example of FIG. 10 the visual tree represents a window on a computer display screen. The visual 2D root object 1002 for the window has three children, panel visual object 1004, checkbox visual object 1006, and visual 3D object 1008. The panel visual object 1004 is a container visual object and has two children, a button visual object 1010 and a scrollbar visual object 1012. Thus the programmer is creating a window with a button, a scroll bar and checkbox along with a 3D scene object to provide 3D scene viewed as a 2D image.

The 3D scene object 1008 points to camera parameters 1011 with pointer 1009 and points to the 3D scene 1016 with pointer 1014. The 3D scene is made up of two model 3D group objects 1018 and 1020, two model 3D primitive objects 1024 and 1025, and a model 3D light object 1022. Each of the 3D primitives contains drawing context and in each case they illustrate a different drawing context possibility. The light object 1022 specifies the illumination of the models drawn by primitive object 1024 as the light object 1022 and primitive object 1024 are children of group object 1020. Primitive object 1024 contains mesh information 1026 and material information 1028. Primitive 1025 contains mesh information 1027 and material information 1029. The material information 1029 points to a further visual tree that has visual tree root 1030, and both a visual 2D object 1032 and a 3D scene object 1034.

The operational flow for processing the visual tree in FIG. 10 begins in FIG. 8, which shows visual 2D object processing with a bridge to 3D scene object processing. As will become apparent in the description of this operation flow, the flow in FIGS. 8 and 9 is a recursive flow. The operation flow processes a branch of the tree down to the leaves and then processes other branches down to the leaves. As described in FIG. 1 the tree traversal and image rendering sequence is from left to right; however, it could be organized any number of ways as, for example, from right to left through the tree, or by length of branches or by any other priority for traversing the tree the programmer might wish to implement.

FIG. 8 begins processing the visual tree in FIG. 10 when the visual tree process is called by a call operation (not shown) outside of FIG. 8. That call operation is the primary caller to the process for creating a window starting with window object 1002. The operation flow creating the window enters at visual tree process entry 800. Move operation 801 moves the processing to the next object in the tree which has not been processed. The first such object is window object 1002. The operation flow enters loop 802 which contains call operation 803 and more objects test operation 704. As visual 2D objects are processed, the operations in the loop 802 walk the process through the tree.

Call operation 803 calls 2D process entry point 805. At entry point 805 the operation flow passes to 3D scene test operation 806. Test operation 806 detects whether the object is a 3D scene object or a visual 2D object. If it is a visual 2D object, as in this case for window object 1002 in FIG. 10, the operation flow branches "NO" to process visual operation 808. Process operation 808 executes the window object 1004 to draw a window image. The operation 808 is described in related patent application cross referenced above and entitled Visual And Scene Graph Interfaces. After the process visual operation 808 is completed, the return operation 810 returns the operational flow to call operation 803.

At call operation 803 the flow is directed to more objects test operation 804. More objects test operation 804 detects whether there are more objects to be processed in the visual tree. If there are, the operation flow branches YES to move operation 801. Move operation 801 moves down the left most branch of the tree to panel object 1004 in FIG. 10 which is the next unprocessed object. The branches of the tree will be processed from left to right.

Panel object 1004 is another visual 2D object and is processed in the same manner as just discussed for window object 1002. Return operation again returns the flow to call operation 803 and the flow passes to move operation 801. Processing now moves to the first child of panel object 1004 which is button visual 2D object 1010. Button object is processed for as described above for object 1002 and the flow returns to call operation 803 and hence to move operation 801. The next unprocessed object in the same branch is the scroll bar visual object 1012. This is a visual 2D object, and the operation flow will again pass to process visual 2D operation 808 through 3D scene test operaion 806. Process visual 2D operation 808 will process the scroll bar visual object 1012 in the same manner as described above for the processing of the window object 1002. The operation flow again returns to the call operation 803, and move operation 801 walks the visual tree in FIG. 6 to the first object in the next branch, i.e. check box object 1006.

After the checkbox visual 2D object 1006 is processed, move operation 801 walks the tree to 3D scene object 1008. The 3D scene object 1008 will be detected by test operation 806, and the operation flow will branch "YES" to call 3D scene process at call operation 812. The 3D scene process operational flow is illustrated in FIG. 9, and call operation 812 passes the operation flow to 3D scene entry point 900 in FIG. 9.

In FIG. 9, move operation 901 moves the processing to the next object in the 3D scene tree which has not been processed. The first such object is 3D group object 1018 which is also the root node of the 3D scene tree. The operation flow enters loop 902 which contains call operation 903 and more objects test operation 904. As model 3D objects in the 3D scene tree 1016 are processed, the operation flow around the loop 902 walks the process through the branches of the 3D scene tree from left to right.

Call operation 903 calls 3D process module entry point 909. At entry point 909 the operation flow passes to group object test operation 914. The first object is 3D group object 1018. The group test operation 914 will detect the group object and branch the operation flow to the process 3D group operation 930. A group operation might be a transform operation or other operations such as setting a model clip operation, a shading operation, a wire frame operation, etc. After process group operation 930, the return to caller operation 920 again returns the flow to call operation 903.

A return to call operation 903 causes the flow to pass around loop 902 to more objects test operation 904. More objects test operation 904 detects whether there are more objects to be processed in the 3D scene tree. If there are, the operation flow branches YES to move operation 901. Move operation 901 moves down the left most branch of the 3D scene tree to 3D group object 1020 in FIG. 10 which is the next unprocessed object. The branches of the tree will be processed from left to right.

Model 3D object 1020 is another group object and group test operation 914 will branch the flow YES to process group operation 930 to process group object 1020. Return operation 920 again returns the flow to call operation 903, and the flow passes to move operation 901. Processing now moves to the model 3D light object 1022 which is the next unprocessed object in the same branch of the 3D scene tree 1016. Group object test operation passes the flow to light object test operation 916. Light object 1022 is detected and passed to process light object operation 918. Process light operation sets the light for the 3D scene collected by 3D group object 1020, and the flow then passes to return-to-caller operation 920.

The flow returns to call operation 903 and hence to move operation 901. The next unprocessed object in the same branch is the 3D primitive object 1024. Primitive objects draw the 3D models. Group object test 914 and light object test 916 respond with negative results when detecting primitive object 1024. Accordingly, the operation flow branches "NO" from light object test 916 to retrieve camera operation 922 which retrieves the camera parameters. Set view operation 924 then sets the camera or 2D view, and the operation flow passes to 2D content test operation 926. Since the primitive object 1024 in FIG. 10 has no visual objects and thus no 2D content attached, the operation flow would branch "NO" to draw primitive operation 928. Draw primitive operation 928 draws a 3D model based on mesh information 1026 and material information 1029 contained in the model 3D primitive object 1024. The model is drawn from the perspective of the camera view based on the camera parameters. The result is a 2D image of a 3D model as illuminated according to light object 1022. At return-to-caller operation 920, the operation flow returns to the call operation 903 again. More objects test operation 904 detects that there are more objects in the 3D scene tree to be processed. Move operation 901 walks the 3D scene tree to the next branch and to 3D primitive object 1025, the next unprocessed object.

The 3D primitive object 1025 does have material information 1029 that includes both visual 2D and 3D scene objects in the material information. Accordingly, the operation flow branches YES from 2D content test operation 926 to call visual tree process operation 932. Call visual tree process calls the visual tree entry point 800 in FIG. 8, and move operation 801 moves program control to process visual 2D object 1030. Call operation 803 calls the 2D process, and visual 2D object 1030 is processed by process visual operation 808. The operation flow passes to return-to-caller operation 810 and returns to call operation 803. Move operation 801 then walks the 2D content tree to visual 2D object 1032. The 2D process is called again to process visual 2D object 1032. Object 1032 is processed by process visual operation and the operation flow returns to loop 802. Now the move operation 801 moves control to 3D scene object 1034.

Call operation 803 calls the 2D process, and the 3D scene object 1034 will be detected by 3D scene test operation 806. As a result call operation 812 calls the 3D scene process in FIG. 9 to process model 3D objects (not shown) of a 3D scene. The processing would be the same as that discussed above in the example of 3D scene 1016. The 3D scene object 1034 in FIG. 9 is called to process the 3D scene models represented by visual 3D object 1034, and when the last model for the 3D scene object 1034 is drawn, the operation flow passes to return-to-caller operation 920 in FIG. 9. The caller in this situation is call operation 903.

Call operation 903 passes the flow to more objects test 904 detects that there are no more objects associated with the 3D scene object 1034. The operation flow branches NO to return to caller operation 906 which passes the flow back to call operation 812. Call operation passes the flow to call operation 803. More objects test operation 804 detects there are no more objects to be processed for the 2D content tree composed of objects 1030, 1032 and 1034. Accordingly the flow branches NO to return to caller operation 814. In this case the return is to call operation 932 that called the visual tree process to handle the 2D content tree. Draw 3D primitive operation 934 now draws the 3D model for primitive object 1025 using the material information represented by 2D content tree objects 1030, 1032 and 1034. Return to caller operation 920 then returns the flow to call operation 903.

More objects test operation 904 then detects no more objects in the 3D scene tree 1016 and passes the flow to return to caller operation 906. Return operation 906 now returns the flow to call 3D scene operation 812 in FIG. 8. The flow then is passed back to call operation 803 by return operation 810. More objects test operation 804 detects that the visual tree of FIG. 10 has been completely processed and therefore passes the operation flow to return-to-caller operation 810. The return-to-caller operation passes the program control back to caller 932. Call operation 932 calls the 2D process in FIG. 8 which now processes visual 2D object 1030. Visual 2D object 1030 is the root object for the material information 1028. Process visual operation 808 processes root object 1030, and return-to-caller operation 810 passes program control back to primary caller (not shown) that called to process the visual tree of FIG. 10. This completes the processing of the example visual tree in FIG. 10 with its integrated 3D scene objects and visual 2D objects.

Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer implemented method for processing a hierarchy of computer program visual objects for creating a mix of two dimensional (2D) and three-dimensional (3D) images as output from a computer, the method comprising:
    traversing branches of a first tree hierarchy of visual objects to process leaf objects and branch objects;
    detecting whether the next unprocessed visual object is a visual 2D object or a 3D scene object; and
    calling a 2D process to process a visual object if a visual 2D object is detected and calling the 3D process to process a model 3D object if a 3D scene object is detected.

2. The method of claim 1, wherein the 3D process comprises:
    setting a camera view; and
    drawing images of one or more 3D models defined by one or more model 3D objects, the images being based on the camera view of the one or more 3D models.

3. The method of claim 2, wherein the 3D models are defined as a second tree hierarchy of one or more model 3D objects pointed to by a 3D scene object.

4. The method of claim 3, wherein the one or more model 3D objects in the second tree define(s) a third tree hierarchy of visual objects for use in drawing the 3D models.

5. The method of claim 4, wherein the third tree hierarchy has at least one visual 2D object that in turn defines a fourth tree hierarchy of model 3D objects whereby 3D scene objects and visual 2D objects may be integrated at a plurality of successive objects along branches of an object tree hierarchy and processed by the appropriate 2D process and 3D process.

6. A computer readable medium encoded with a data structure of computer program objects for integrating visual objects for two-dimensional images and visual objects for two-dimensional images of three-dimensional models, said data structure comprising:
    a visual tree hierarchy of visual objects creating two-dimensional images;
    one or more of the visual objects being a 3D scene object referencing a 3D model and a two-dimensional view of the 3D model;
    the 3D model defined by a second tree hierarchy of objects; and
    the objects of the second tree comprising at least a drawing object defining the operations to draw the 3D model, and a light visual object defining the illumination.

7. The computer readable medium of claim 6, wherein the two-dimensional view of the 3D models is defined from the perspective of a defined first position and a defined second position; and the first and second positions defining an aim direction for the view of the 3D model.

8. The computer readable medium of claim 7, wherein the first position is a camera position point, and the second position is a "look-at" position point.

9. The computer readable medium of claim 7, wherein the drawing object contains material information used in texturing the surfaces of the model.

10. The computer readable medium of claim 9, wherein the material information defines a third tree hierarchy of objects.

11. The computer readable medium of claim 10, wherein the data structure further comprises:
    one or more of the objects of the third tree hierarchy being a 3D scene object referencing a second 3D model and a two-dimensional view of the second 3D model;
    the second 3D model defined by a fourth tree hierarchy of objects; and
    the objects of the fourth tree comprising at least a drawing object defining the operations to draw the 3D model, and a light visual object defining the illumination of the 3D model.

12. The computer readable medium of claim 11, wherein the drawing objects in the data structure further contains mesh information for defining planar shapes for approximating the contours of the 3D model.

13. A computer-readable medium having computer-executable instructions for performing the steps of:
    instantiating a data structure of a computer program objects for integrating visual objects for two-dimensional images and visual objects for two-dimensional images of three-dimensional models; and
    encoding the data structure of computer program objects said data structure further comprising,
    a visual tree hierarchy of visual objects creating two-dimensional images;
    one or more of the visual objects being a 3D scene object referencing a 3D model and a two-dimensional view of the 3D model;
    the 3D model defined by a second tree hierarchy of objects; and
    the objects of the second tree comprising at least a drawing object defining the operations to draw the 3D model, and a light visual object defining the illumination of the 3D model.

14. The computer readable medium of claim 13, further comprising instructions for encoding the two-dimensional view of the 3D models as defined from the perspective of a defined first position and a defined second position; and the first and second positions defining an aim direction for the view of the 3D model.

15. The computer readable medium of claim 14, further comprising the instructions for encoding the first position as a camera position point, and the second position as a "look-at" position point.

16. The computer readable medium of claim 14, further comprising instructions for encoding the drawing object to contain material information used in texturing the surfaces of the model.

17. The computer readable medium of claim 16, further comprising instructions for encoding material information to define a third tree hierarchy of objects.

18. The computer readable medium of claim 17, wherein the instructions steps for encoding the data structure further comprises instructions for:
    encoding one or more of the objects of the third tree hierarchy to be a 3D scene object referencing a second 3D model and a two-dimensional view of the second 3D model;

encoding the second 3D model as defined by a fourth tree hierarchy of objects; and encoding the objects of the fourth tree to comprise at least a drawing object defining the operations to draw the 3D model, and a light visual object defining the illumination of the 3D model.

19. The computer readable medium of claim 18, further comprising instructions for encoding the drawing objects in the data structure with mesh information to define planar shapes for approximating the contours of the 3D model.

* * * * *